T. A. EDISON.
STORAGE BATTERY.
APPLICATION FILED SEPT. 16, 1919.

1,379,088. Patented May 24, 1921.

Witnesses:
N. D. Fisher.
William A. Hardy.

Inventor:
Thomas A. Edison
By Dyer & Holden
his Attys.

UNITED STATES PATENT OFFICE.

THOMAS A. EDISON, OF LLEWELLYN PARK, WEST ORANGE, NEW JERSEY.

STORAGE BATTERY.

1,379,088.  Specification of Letters Patent.  Patented May 24, 1921.

Application filed September 16, 1919. Serial No. 324,058.

*To all whom it may concern:*

Be it known that I, THOMAS A. EDISON, a citizen of the United States, and a resident of Llewellyn Park, West Orange, in the county of Essex and State of New Jersey, have invented certain new and useful Improvements in Storage Batteries, of which the following is a description.

My invention relates generally to storage batteries and more particularly to storage batteries of the Edison type wherein nickel hydroxid is opposed to finely divided electrolytically active iron or oxid of iron in an alkaline solution as the electrolyte, as described in several of my prior patents. See, for example, Patent No. 723,450 dated March 24, 1903.

The principal object of the present invention is to provide an improved storage battery with the elements thereof so constructed and arranged as to result in a greatly increased discharge rate, especially in the case of storage batteries of the Edison type.

To effect the starting of the internal combustion engine employed for driving an automobile by means of a starting system comprising an electric starting motor and a storage battery for supplying current to the motor, it is necessary for the storage battery of such a starting system to have a high rate of discharge. In the case of the Ford car a storage battery capable of supplying the starting motor with current of 150 to 175 amperes at six volts is required. Edison storage batteries being now made with longevity as one of the principal objects in view, the size, cost and weight of Edison batteries of the present construction which will give sufficiently high discharge rates are too great to permit their general use in starting systems for automobiles, especially in the case of the Ford car.

This invention is directed especially to an improved storage battery of the Edison type adapted to meet the requirements for commercial use in automobile engine starting systems, namely, small weight, low cost and high discharge rate.

More specifically described, my invention consists in the employment of a new and improved battery pile for alkaline batteries of the Edison type in place of the present plate assembly of such batteries consisting of alternately arranged positive and negative plates separated and insulated from each other, and each comprising a steel grid carrying a plurality of perforated pockets or tubes containing the active material tightly packed therein. This battery pile preferably consists of a series of very thin, imperforate nickel-plated steel sheets separated by strips or sheets of paper or other suitable thin flexible insulating material, with thin layers of finely divided active material respectively disposed between the surfaces of each of the thin steel sheets and the adjacent paper strips or sheets and preferably carried by the latter, the whole being securely held together preferably by means comprising a plurality of very heavy, powerful springs whereby the active material will constantly be adjustably maintained under a high pressure firmly in contact with the thin, imperforate nickel-plated steel sheets.

In order that my invention may be more clearly understood, attention is directed to the drawing accompanying and forming a part of this specification and in which :—

Figure 1:
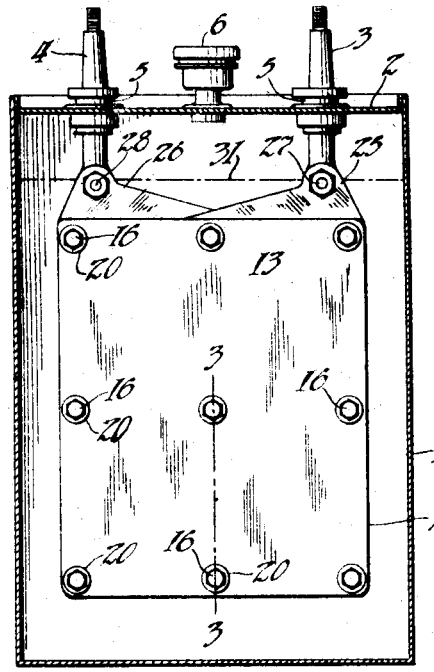
Figure 1 is a view in side elevation of a storage battery cell in accordance with my invention, the container being shown in section.

Referring to the drawing, reference character 1 represents the container of a battery in accordance with my invention which is similar to that used in the usual type of Edison batteries and is preferably made of nickel-plated steel, and 2 the top thereof. Negative and positive poles 3 and 4 extend through suitable stuffing boxes 5—5 provided in the top 2 of the container, and form fluid-tight joints therewith. The top 2 is also provided with the usual filler 6 through which the electrolyte in the cell may be replenished.

Reference character A represents my improved battery pile which is made up of a plurality of superposed and alternately arranged negative and positive elements. Each of the negative elements comprises an imperforate very thin steel sheet 7 which is preferably electro-plated with nickel and then brought to a bright yellow heat in an atmosphere of hydrogen to weld the nickel to the steel, and two sheets 8 of thin blotting paper each preferably carrying and entirely covered on one side with a thin layer or coating 9 of electrolytically active finely divided iron mixed with a small amount of mercury, respectively disposed adjacent the sides of the sheet 7 with the coatings of iron in contact therewith. Each of the positive elements comprises a thin nickeled steel sheet 10 similar to sheet 7 of the negative elements, and two sheets 11 of thin blotting paper each carrying and entirely covered on one surface with a thin layer or coating 12 of powdered nickel hydroxid respectively disposed adjacent the sheet 10 on opposite sides thereof with the coatings of nickel hydroxid in contact therewith. Two strong very thick nickel-plated steel pressure plates 13 and 14 are respectively disposed at the sides of the series of superposed negative and positive elements and in contact therewith. After the positive and negative elements and the heavy outer pressure plates 13 and 14 have been assembled as described, a plurality of rods 15 are respectively inserted through suitable openings provided therefor in the edge portions and center of said plates and elements so that the heads 16 at one end of the rods will be closely adjacent one of the heavy pressure plates 13. The rods are of such length that they will extend a considerable distance outwardly beyond the pressure plate 14. Nuts 17 are threaded on the ends of the rods 15 adjacent the plate 14 and very powerful resilient members such as the heavy coil springs 18 or large soft rubber sleeves are respectively disposed on the rods 15 between the nuts 17 and the heavy pressure plate 14. Each of the rods 15 extends through a sleeve 19 of hard rubber or other suitable non-conducting material which is disposed in and closely fits the openings in the plates 13 and 14 and the positive and negative elements provided for such rod. The head 16 of each rod 15 is suitably insulated from the pressure plate 13 as by means of a washer 20 formed of hard rubber or other suitable non-conducting material and the inner end of each of the springs 18 is similarly insulated from the pressure plate 14 by means of a non-conducting washer 21. The nuts 17 and corresponding washers 21 are respectively provided with opposed bosses 22 and 23 which coact with the ends of the springs 18 to maintain the latter in proper alined position on the rods 15. By this construction plates 13 and 14 and the negative and positive elements are securely fastened together. Moreover the active material is constantly maintained under a high pressure firmly and evenly in contact with the thin nickeled steel sheets 7 and 10 and at the same time the paper sheets 8—8 and 11—11 are allowed to expand or swell as they become saturated with the electrolyte, which is necessary in order that the whole of the active material will be effective in the operation of the cell. These results are due to the use of the powerful resilient members, such as the strong heavy springs 18 or large soft rubber sleeves, which automatically take care of all expansion of the battery pile, which increases with time, due to the swelling of the sheets of blotting paper 8—8 and 11—11, while maintaining the active material firmly and evenly in contact with the thin steel sheets 7 and 10 under the desired pressure. Unless the nickel hydroxid and finely divided electrolytically active iron are thus continuously forced against the sheets 7 and 10 under a high pressure, the capacity of the cell will be very inconstant.

The thin steel sheets 7 of the negative elements are provided at the top and at one side with upwardly extending apertured lugs 26, while the thin steel sheets 10 of the positive elements are provided at the top and the opposite side with similar lugs 25. Steel bolts 27 and 28 respectively extend through the lugs 25 and 26, and steel spacing sleeves 29 are mounted on these bolts between each pair of adjacent lugs. The tightening of nuts 30 threaded on the bolts 27 and 28 serves to secure the spacing blocks 29 and the corresponding lugs 25 and 26 firmly together to make good contact with each other. One of the spacing blocks 29 on the bolt 27 is formed integrally with the negative pole 3 of the cell and one of the spacing blocks 29 on the rod 28 is integrally formed with the positive pole 4. It will thus be seen that the negative and positive elements of the battery pile are respectively electrically connected with the poles 3 and 4 of the cell, and that the battery pile is rigidly connected to the poles and suspended therefrom.

Figure 2:
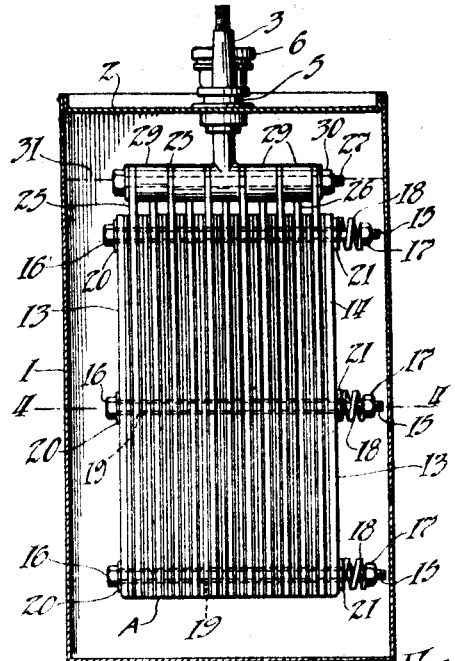
Fig. 2 is an end view in elevation of the cell shown in Fig. 1, the container being shown in section.
Figures 3, 4:
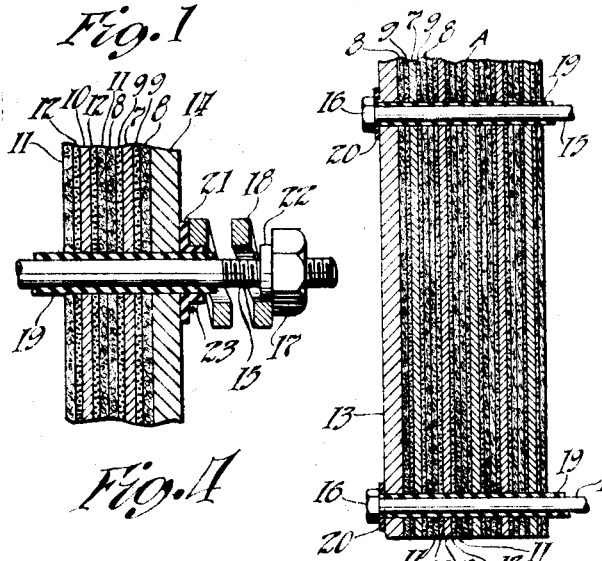
Fig. 3 is a greatly enlarged fragmental sectional view taken on line 3—3 of Fig. 1.
Fig. 4 is a view similar to Fig. 3 taken on line 4—4 of Fig. 2.
Figure 6:
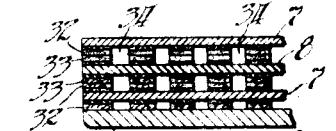
Fig. 6 is a sectional view taken on line 6—6 of Fig. 5.
Figure 5:
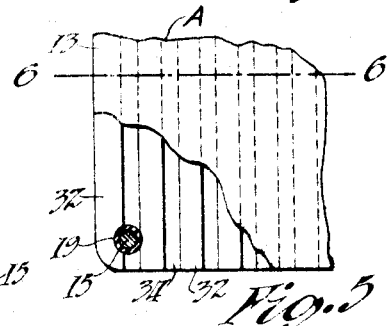
Fig. 5 is an enlarged fragmental view in side elevation, partly broken away, of a modified form of battery pile.

Reference character 31 (Figs. 1 and 2) represents the level of the alkaline electrolyte in which the battery pile A is suspended, such electrolyte preferably consisting of a 21% solution of caustic potash containing about 2% by weight of lithium hydroxid.

Where storage battery cells of the Edison type are subjected to heavy overcharging, the cells give off a very considerable amount of gas. If a cell of the construction shown in Figs. 1 and 2 were heavily overcharged, the battery pile would be apt to be damaged or even disrupted as there is no provision for the escape of gas between the positive and negative elements thereof. Accordingly, where a cell of the type described herein is to be used under conditions where it is liable to be subjected to heavy overcharging, I preferably employ a plurality or series of spaced thin strips 32 of flexible insulating material such as paper coated on one side with a thin layer of electrolytically active finely divided iron in place of each of the continuous sheets of coated blotting paper 8 of the construction shown in Figs. 1 to 4, and similarly a series of spaced thin strips 33 provided on one side with a coating or layer of nickel hydroxid in place of each of the coated sheets 11, as shown in Figs. 5 and 6. By this construction a series of small vertical channels 34 extending from the bottom to the top of the battery pile is provided between each pair of adjacent elements, whereby any gas generated within the pile is permitted to readily escape therefrom.

Cells constructed as described herein have a very high discharge rate, are of small weight, and are cheap to manufacture; and accordingly the use thereof in starting systems for automobiles is practicable. The number and size of the positive and negative elements and the dimensions of the component parts thereof depends largely upon the use for which the cell is designed and of course may be varied as desired. In no case, however, should the thickness of the layer of nickel hydroxid on each of the thin sheets or strips of paper or other flexible insulating material carrying the same be greater than .015" as the nickel hydroxid has a very small conductivity. The layer or coating of finely divided iron on each of the insulating sheets or strips carrying the same may be of such a thickness that it will readily receive capacity sufficient to discharge the adjacent layer of nickel hydroxid.

Where cells of this type are to be used in an electric starting system for Ford cars the battery pile of each cell is preferably made up of about 25 positive elements or plates and 26 negative elements or plates, each measuring about 5" x 6", each of the thin steel sheets of the negative and positive elements is preferably about .015" in thickness, each layer of nickel hydroxid is about .010" thick, and each layer of finely divided iron is about .015" to .020" in thickness.

Instead of using blotting paper for the sheets or strips of flexible insulating material, carrying the layers of active material, I may use sheets or strips of cloth or of pure asbestos. I prefer to use paper, however, as I find that the pressure with which the nickel hydroxid is maintained in contact with the adjacent nickeled steel sheets, is more even when paper is employed, and moreover paper is less expensive than either cloth or asbestos.

It is to be understood that my invention is not limited to the specific embodiments shown and described herein, but only as defined by the terms of the appended claims.

Having now described my invention, what I claim as new and desire to protect by Letters Patent is as follows:

1. A battery pile comprising a series of superposed thin conductive sheets separated by thin pieces of flexible insulating material, thin layers of active material respectively disposed between and in engagement with both surfaces of each of the sheets and the adjacent surfaces of the pieces of insulating material, and means for securing all of said elements together whereby the active material is constantly and adjustably held under pressure firmly in substantially uninterrupted surface contact with said sheets, substantially as described.

2. A battery pile comprising a series of superposed thin conductive sheets, each pair of adjacent sheets being separated by a series of spaced thin strips of flexible insulating material, thin layers of active material respectively disposed between both surfaces of each of the conductive sheets and the adjacent surfaces of the strips of insulating material, and means for securing all of said elements together whereby the active material is constantly held under pressure firmly in contact with said sheets, substantially as described.

3. A battery pile comprising a series of superposed thin conductive sheets, each pair of adjacent sheets being separated by a series of spaced thin strips of paper, thin layers of active material respectively disposed between both surfaces of each of the conductive sheets and the adjacent surfaces of the strips of paper, and means for securing all of said elements together whereby the active material is constantly held under pressure firmly in contact with said sheets, substantially as described.

4. A battery pile for alkaline storage batteries comprising a series of superposed thin steel sheets coated with nickel separated by thin pieces of flexible insulating material, thin layers of active material respectively disposed between both surfaces of each of said sheets and the adjacent surfaces of the pieces of insulating material, the active material in contact with any pair of adjacent sheets respectively comprising finely divided electrolytically active iron and powdered nickel hydroxid, and means for securing said elements together whereby the active material is constantly held under pressure firmly in substantially uninterrupted surface contact with said sheets, substantially as described.

5. In a storage battery, a container, a positive pole and a negative pole extending from the container, an alkaline electrolyte in said container, a battery pile in said electrolyte comprising a series of superposed thin steel sheets coated with nickel separated by thin pieces of flexible insulating material, thin layers of active material respectively disposed between both surfaces of each of said sheets and the adjacent surfaces of the pieces of insulating material, the active material in contact with any pair of adjacent sheets respectively comprising finely divided electrolytically active iron and powdered nickel hydroxid, and means for securing said elements together whereby the active material is constantly held under pressure firmly in substantially uninterrupted surface contact with said sheets, all of the steel sheets having nickel hydroxid in contact therewith being electrically connected with the positive pole and all the steel sheets having finely divided iron in contact therewith being electrically connected with the negative pole, substantially as described.

6. A pile for alkaline storage batteries comprising a series of superposed alternately arranged positive and negative elements, each of said elements consisting of a thin steel sheet coated with nickel and one or more thin flexible pieces of insulating material each carrying a thin layer of finely divided active material on one surface disposed on each side of said sheet with the active material contacting the same, said active material comprising powdered nickel hydroxid in the case of the positive elements and finely divided electrolytically active iron in the case of the negative elements, and means for rigidly securing said elements together and constantly holding the said active material under a strong pressure firmly in substantially uninterrupted surface contact with the respective sheets, substantially as described.

7. A pile for alkaline storage batteries comprising a series of superposed alternately arranged positive and negative elements, each of said elements consisting of a thin steel sheet coated with nickel and one or more thin flexible pieces of insulating material each carrying a thin layer of finely divided active material on one surface disposed on each side of said sheet with the active material contacting the same, said active material comprising powdered nickel hydroxid in the case of the positive elements and finely divided electrolytically active iron in the case of the negative elements, nickel-plated heavy steel pressure plates respectively disposed at either side and against the series of superposed elements, and means constantly tending to force said pressure plates toward each other under a high pressure, substantially as described.

8. A pile for alkaline storage batteries comprising a series of superposed alternately arranged positive and negative elements, each of said elements consisting of a thin steel sheet coated with nickel and one or more thin flexible pieces of insulating material each carrying a thin layer of finely divided active material on one surface disposed on each side of said sheet with the active material contacting the same, said active material comprising powdered nickel hydroxid in the case of the positive elements and finely divided electrolytically active iron in the case of the negative elements, nickel-plated heavy steel pressure plates respectively disposed at either side of and against the series of superposed elements, and means comprising powerful resilient members constantly tending to force said pressure plates toward each other under a high pressure, substantially as described.

9. A battery pile comprising a series of superposed alternately arranged positive and negative elements, a pair of heavy pressure plates respectively disposed at either side of and against the series of superposed elements, a plurality of rods extending through said pressure plates and provided with heads at one end, said rods extending at their other end portions a considerable distance beyond the adjacent pressure plates and having nuts threaded on said extending end portions, and powerful resilient members surrounding said rods and disposed between said nuts and the adjacent pressure plates, substantially as described.

10. A battery pile comprising a series of superposed thin metallic sheets separated by thin pieces of paper, thin layers of finely divided active material respectively disposed between both surfaces of each of said metallic sheets and the adjacent surfaces of the pieces of paper, a pair of heavy pressure plates respectively disposed against the outermost pieces of paper, and means comprising powerful resilient members coacting with said pressure plates and constantly tending to move said pressure plates toward each other while permitting such plates to move away from each other under the expansion or swelling of the pieces of paper, substantially as described.

11. A storage battery comprising a conductive plate, a porous insulating member, active material between and in engagement with the plate and insulating member, and resilient means for yieldingly pressing said plate and member together, whereby said active material is constantly held under pressure firmly in substantially uninterrupted surface contact with said plate, substantially as described.

12. A storage battery comprising a series of conducting plates, flat porous insulating members respectively disposed between the adjacent plates, active material between and in engagement with the adjacent insulating members and the plates, and resilient means for yieldingly pressing said plates and members together, whereby the active material is constantly held under pressure firmly in substantially uninterrupted surface contact with the adjacent plates, substantially as described.

This specification signed this 13th day of September, 1919.

THOS. A. EDISON.